(12) United States Patent
Grillon et al.

(10) Patent No.: US 11,588,378 B2
(45) Date of Patent: Feb. 21, 2023

(54) LIQUID-COOLED CORE ASSEMBLY FOR LINEAR MOTORS AND LINEAR MOTOR COMPRISING SUCH CORE ASSEMBLY

(71) Applicant: ETEL S.A., Môtiers (CH)

(72) Inventors: Jean-Yves Grillon, Granges-Narboz (FR); Jean Lefevre, La Cluse et Mijoux (FR); Loïc Moreno, Guyans-Vennes (FR)

(73) Assignee: ETEL S.A., Môtiers (CH)

( * ) Notice: Subject to any disclaimer, the term of this patent is extended or adjusted under 35 U.S.C. 154(b) by 181 days.

(21) Appl. No.: 17/097,445

(22) Filed: Nov. 13, 2020

(65) Prior Publication Data
US 2021/0152051 A1    May 20, 2021

(30) Foreign Application Priority Data
Nov. 19, 2019 (EP) .................................... 19210158

(51) Int. Cl.
*H02K 9/193* (2006.01)
*H02K 1/20* (2006.01)
*H02K 41/02* (2006.01)

(52) U.S. Cl.
CPC .............. *H02K 9/193* (2013.01); *H02K 1/20* (2013.01); *H02K 41/02* (2013.01)

(58) Field of Classification Search
CPC .......... H02K 9/193; H02K 1/20; H02K 41/02; H02K 1/32; H02K 9/19; H02K 2213/03
See application file for complete search history.

(56) References Cited

U.S. PATENT DOCUMENTS

| | | | | |
|---|---|---|---|---|
| 2004/0169427 A1* | 9/2004 | Hoppe | .................. | H02K 5/203 |
| | | | | 310/54 |
| 2018/0091024 A1* | 3/2018 | Huang | ...................... | H02K 5/20 |
| 2019/0131831 A1 | 5/2019 | Lu et al. | | |
| 2020/0412193 A1* | 12/2020 | Eilenberger | ............. | H02K 3/24 |

FOREIGN PATENT DOCUMENTS

| | | | |
|---|---|---|---|
| EP | 1120890 A2 | 8/2001 | |
| JP | 2002-218730 A | 8/2002 | |
| SU | 527796 A1 | 9/1976 | |
| WO | WO-03005535 A2 * | 1/2003 | ............... H02K 1/20 |
| WO | WO-2011069517 A1 * | 6/2011 | ........... E21B 43/127 |

OTHER PUBLICATIONS

JP2002218730A English translation (Year: 2022).*
WO03005535A2 English translation (Year: 2022).*

* cited by examiner

*Primary Examiner* — Tulsidas C Patel
*Assistant Examiner* — Viswanathan Subramanian
(74) *Attorney, Agent, or Firm* — Carter, DeLuca & Farrell LLP

(57) ABSTRACT

A liquid-cooled core assembly for a linear motor includes an iron-core having a middle part, teeth extending from two opposite sides of the middle part and forming slots therebetween, coils wound around the teeth, axial cooling-fluid passageways extending across the middle part, and cooling conduits mounted inside the passageways. The core assembly further includes a cooling arrangement having a liquid supply part and a liquid collection part mounted against respective two other opposite sides of the iron-core. The liquid supply and collection parts are in fluid communications with the cooling conduits. An inlet connector is in fluid communication with the liquid supply part, and an outlet connector is in fluid communication with the liquid collection part.

18 Claims, 5 Drawing Sheets

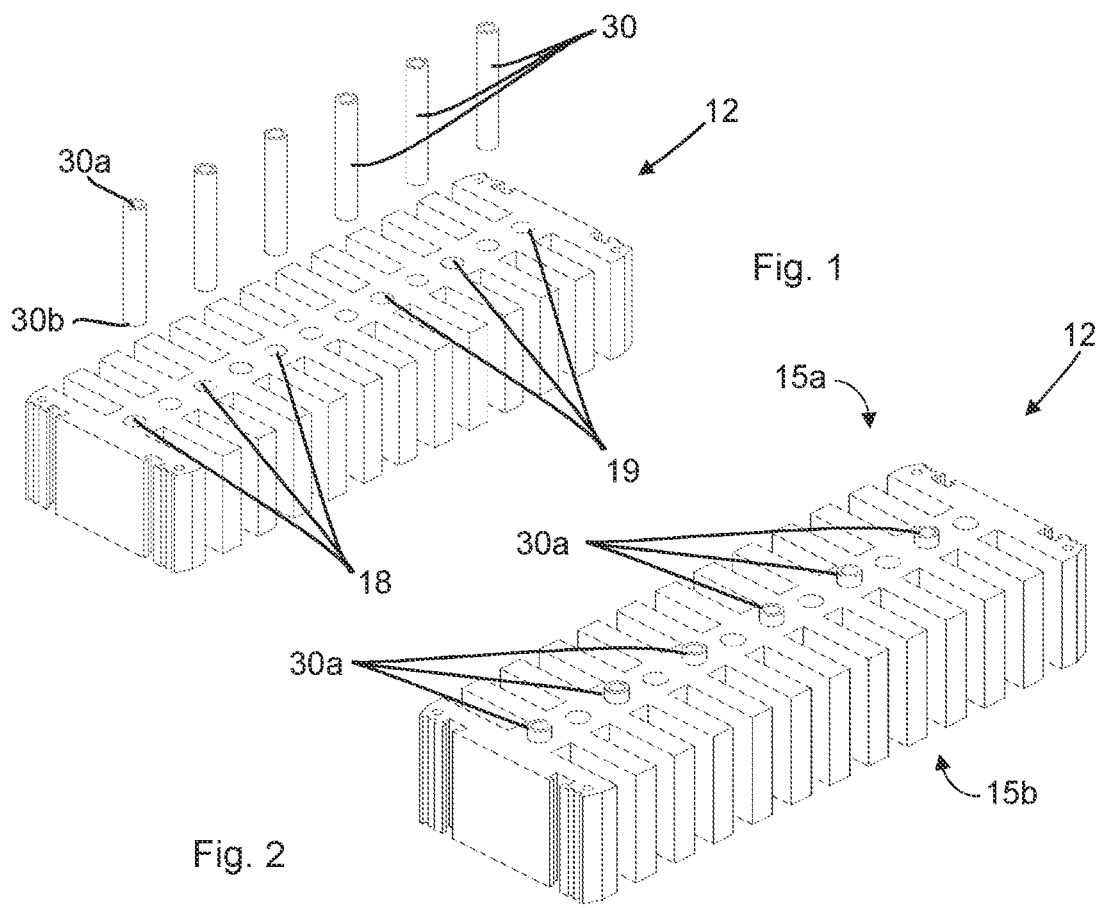
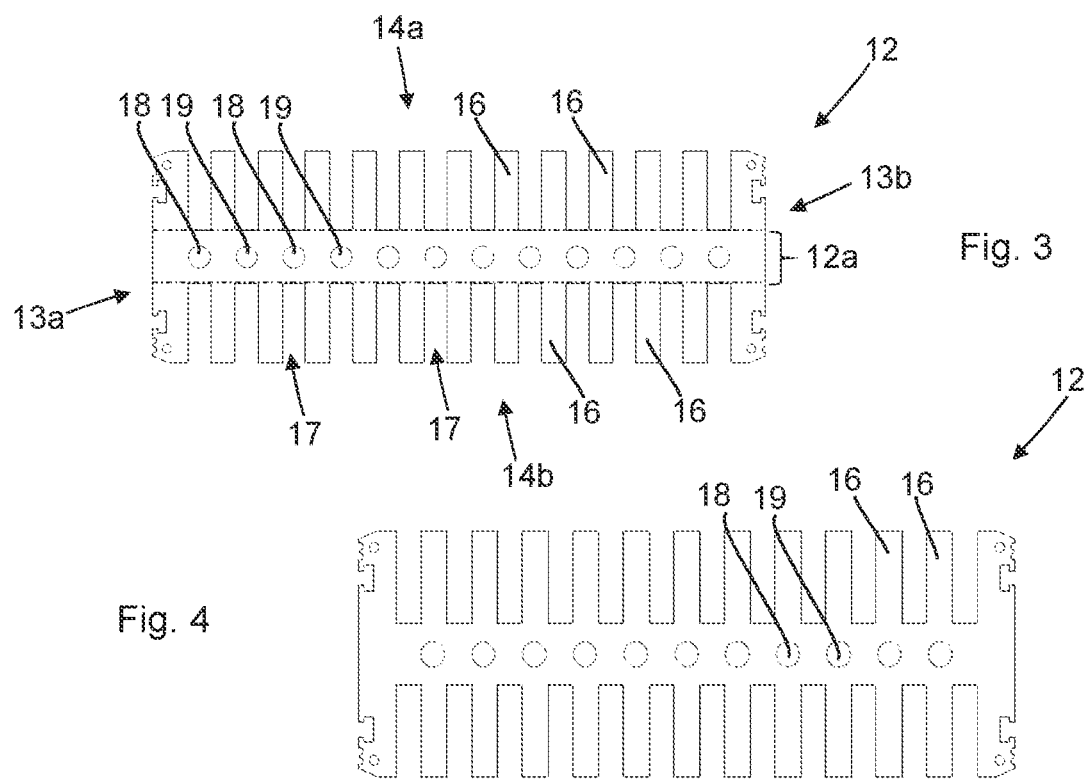

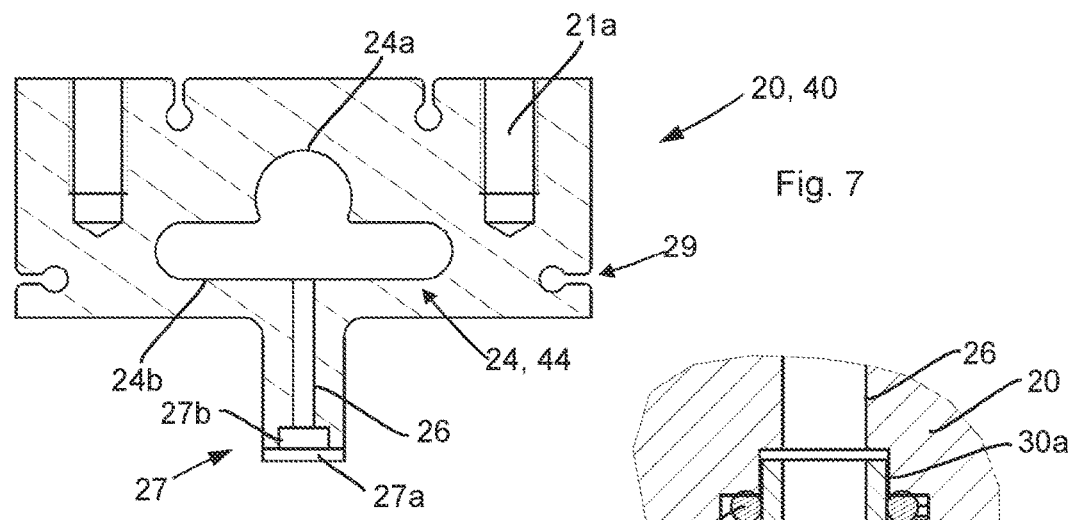
Fig. 7
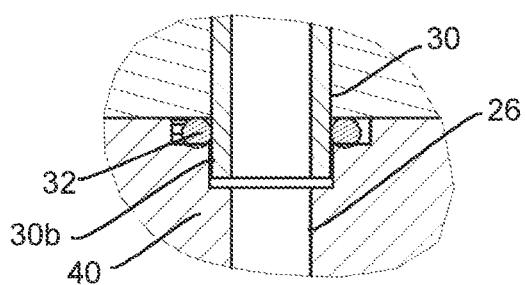
Fig. 8
Fig. 9
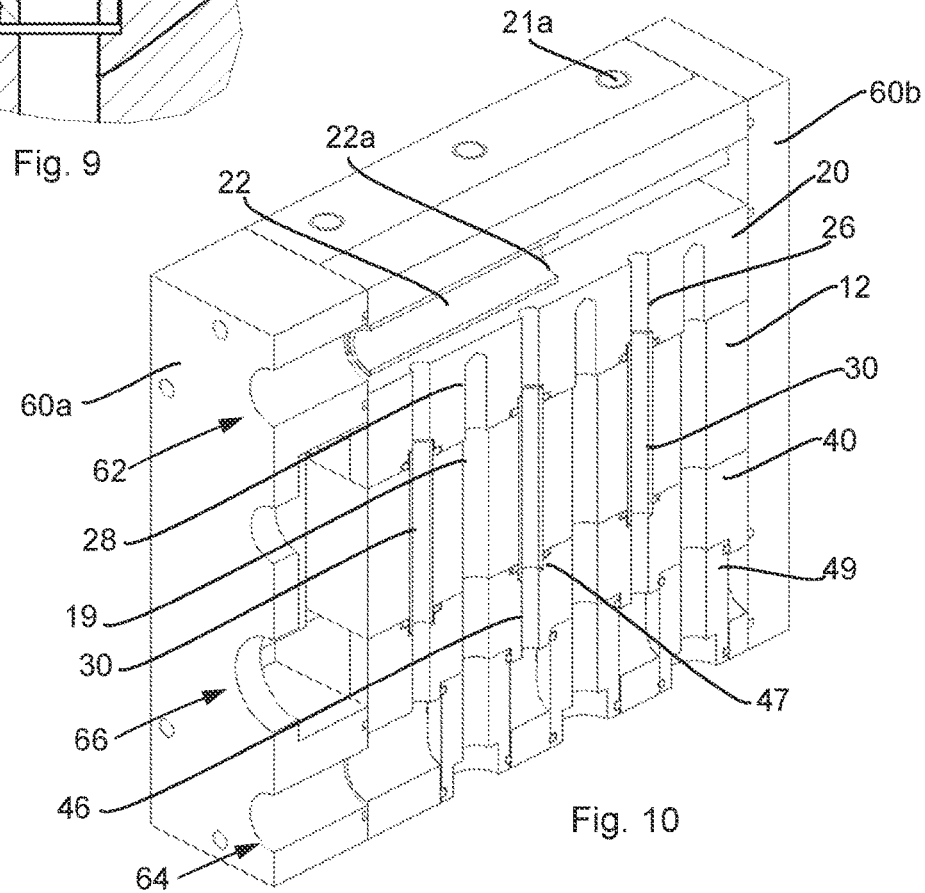
Fig. 10

ND LINEAR MOTOR
LIQUID-COOLED CORE ASSEMBLY FOR LINEAR MOTORS AND LINEAR MOTOR COMPRISING SUCH CORE ASSEMBLY

CROSS-REFERENCE TO RELATED APPLICATIONS

The present application claims priority to Application No. 19210158.2, filed in the European Patent Office on Nov. 19, 2019, which is expressly incorporated herein in its entirety by reference thereto.

FIELD OF THE INVENTION

The present invention relates to a liquid-cooled core assembly for linear motors, including, for example, an iron-core made of a single laminated stack, and also to a linear motor that includes such a liquid-cooled core assembly.

BACKGROUND INFORMATION

Certain liquid-cooled core assemblies as a primary part/motor for linear motors are conventional.

For example, U.S. Patent Application Publication No. 2019/0131831 describes a core assembly for linear motors, including a first core and a second core having two opposite sides provided with slots and linear grooves, respectively. The side of the first and second cores having the linear grooves are mounted against each other to form a plurality of parallel channels inside which are arranged portions of two cooling serpentines. The core assembly is however difficult to manufacture, thereby having a negative impact on the overall cost of the linear motor.

European Published Patent Application No. 1 120 890 and U.S. Patent Application Publication No. 2010/0068290 describe a core assembly for linear motors, including a single lamination stack having slots on both sides for the coils. The linear motor includes a top core cover having a longitudinal groove in the center of the upper surface thereof. A U-shaped cooling pipe for passing a refrigerant is accommodated in the groove, thereby cooling only the upper portion of the lamination stack and the user interface. An ununiform cooling of the lamination stack has the disadvantage of reducing the force to footprint ratio of the linear motor.

SUMMARY

According to example embodiments of the present invention, a liquid-cooled core assembly for linear motors is easy to manufacture and cost-effective.

According to example embodiments of the present invention, a liquid-cooled core assembly for linear motors has an improved force to footprint ratio over conventional systems.

Furthermore, example embodiments of the present invention provide a liquid-cooled core assembly for linear motors having efficient uniform cooling both inside the iron-core and at the customer interface.

Example embodiments of the present invention provide a liquid-cooled core assembly including a customer interface, which may be readily adapted to be compliant with the configuration of a permanent magnet assembly provided by the customer.

According to example embodiments of the present invention, a linear motor includes a liquid-cooled core assembly slidably mounted on a permanent magnet assembly.

According to an example embodiment of the present invention, a liquid-cooled core assembly for a linear motor, includes: an iron-core having a middle part, teeth extending from two opposite sides of the middle part and forming slots therebetween, coils wound around the teeth, axial cooling-fluid passageways extending across the middle part, and cooling conduits mounted inside the passageways; a cooling system that includes a liquid supply part and a liquid collection part mounted against respective two other opposite sides of the iron-core, both the liquid supply and collection parts being in fluid communication with the cooling conduits; an inlet connector in fluid communication with the liquid supply part; and an outlet connector in fluid communication with the liquid collection part.

The liquid supply part may include a liquid supply duct and channels in fluid communication with the liquid supply duct and sealingly connected to a first end portion of respective conduits. The liquid collection part may include a liquid collection duct and channels in fluid communication with the liquid collection duct and sealingly connected to a second end portion of the respective conduits.

The first and second end portions of each conduit may protrude from the respective two other opposite sides inside an end portion of a corresponding channel of respective liquid supply and collection parts.

The end portion of each channel of the liquid supply and collection parts may include a seal receiver portion inside which a seal, e.g., an O-ring, is mounted around the first and second end portions of each conduit.

The iron-core may further include axial through-holes extending across the middle part in an alternate fashion with the cooling-fluid passageways.

The central axis of the passageways and the through-holes may be aligned within a plane crossing the middle part of the iron-core and which is substantially equidistant between the two opposite sides of the middle part.

Each of the axial cooling-fluid passageways and through-holes may be aligned with two slots located on respectively one and the other of the two opposite sides of the middle part.

The liquid supply and collection parts may be assembled against the iron-core by screws.

The liquid supply part may include threaded bores and the liquid collection part may include through-holes. The screws may extend along respective through-holes of the liquid collection part and through-holes of the iron-core. The end portion of the screws may be screwed into the corresponding threaded bore of the liquid supply part.

Screw sleeves may be arranged around sections of the screws that cross the liquid collection duct of the liquid collection part to seal the sections from the liquid collection duct.

Each of the liquid supply and collection parts may have a T-shaped cross-section that is constant along the entire length of the liquid supply and collection parts to form a compartment with respective side of the two other opposite sides of the iron-core for receiving portions of the coils.

An inlet tube may be mounted inside the liquid supply duct. The inlet tube may be in fluid communication with the inlet connector and may extend along a portion of the liquid supply duct such that an end portion of the inlet tube is located between a third and two thirds of the length of the supply duct. The end portion of the inlet tube may be located in the middle of the length of the supply duct.

The liquid-cooled core assembly may include a first and a second mounting part assembled against respective first and second lateral sides of the iron-core and of the liquid supply and collection parts. The inlet and outlet connectors may be mounted into one of the first and second mounting parts.

The inlet connector may be located as close as possible to the customer interface to ensure that the interface remains at ambient temperature.

Cable glands, for electrical connection of the coils, may be mounted on the mounting part that includes the inlet and outlet connectors.

According to an example embodiment of the present invention, a linear motor includes a liquid-cooled core assembly as described above slidably mounted on a permanent magnet assembly.

Further features and aspects of example embodiments of the present invention are described in more detail below with reference to the appended Figures.

BRIEF DESCRIPTION OF THE DRAWINGS

FIG. 1 is a perspective exploded view of an iron-core for linear motors, formed of a single laminated stack and cooling tubes adapted to be fitted inside axial cooling fluid passageways of the iron-core, according to an example embodiment of the present invention.

FIG. 2 is a similar view to that of FIG. 1 with cooling tubes mounted inside their respective cooling fluid passageways.

FIG. 3 is a top view of the iron core illustrated FIG. 2 without the cooling tubes.

FIG. 4 is a similar view to that of FIG. 3 according to another example embodiment of the present invention.

FIG. 7 is a cross-sectional view of the liquid supply part or of the liquid collection part.

FIG. 8 is an enlarged cross-sectional view of an end portion of a cooling tube sealingly connected to a corresponding channel of the liquid supply part.

FIG. 9 is an enlarged cross-sectional view of an end portion of a cooling tube sealingly connected to a corresponding channel of the liquid collection part.

FIG. 10 is a partial perspective view of the liquid-cooled core assembly.

DETAILED DESCRIPTION

Figure 5:
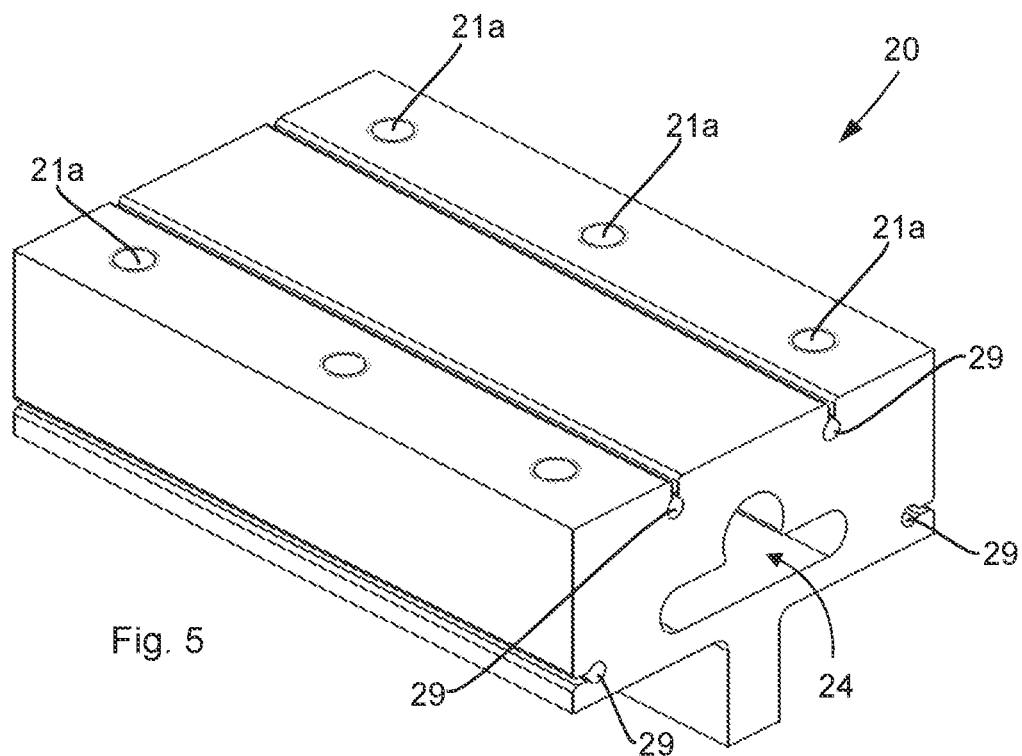
FIG. 5 is a top perspective view of a liquid supply part according to an example embodiment of the present invention.

Within the present context, a liquid-cooled core assembly should be understood as the motor, the moving part, the slider, or the glider, which is configured to be slidably mounted on a permanent magnet assembly of a linear motor. In addition, a customer interface should be understood to refer to the portion of the core assembly to be slidably mounted on the permanent magnet assembly.

Referring, for example, to FIGS. 1 to 4 and 10, a liquid-cooled core assembly 10 includes an iron-core 12 made of a laminated stack. The magnetic iron-core 12 includes a middle part 12a extending between two lateral sides 13a, 13b of the iron-core 12. Teeth 16 extend from two opposite sides of the middle part 12a along two longitudinal sides 14a, 14b of the iron-core 12. Slots 17 formed between the teeth 16 on one side of the middle part 12a are aligned with the slots 17 formed between the teeth 16 on the opposite side of the middle part 12a.

Axial cooling-fluid passageways 18 and through-holes 19 are drilled in the iron-core 12. Through-holes 19 extend across the middle part 12a of the iron-core 12 in an alternate fashion with axial cooling-fluid passageways 18. The central axis of the passageways 18 and through-holes 19 may be aligned within a plane crossing the middle part 12a of the iron-core 12 along its longitudinal direction and which is substantially equidistant between the two opposite sides of the middle part 12a from which the teeth 16 extend.

Each of the cooling-fluid passageways 18 and through-holes 19 is aligned with two corresponding slots 17 located on respectively one and the other of the two opposite sides of the middle part 12a. The passageways and through-holes 18, 19 may also be aligned with two corresponding opposed teeth 16, as illustrated in FIG. 4 although this configuration is not considered preferred for attraction force cancellation because it increases the magnetic stray flux circulating between adjacent teeth 16.

As illustrated, for example, in FIGS. 1 and 2, cooling conduits, e.g., in the form of tubes 30, are inserted in the cooling-fluid passageways 18. Using tubes provides that no fluid leakage occurs between the layers of lamination, which could cause corrosion. The iron-core 12 is heated before insertion of the cooling tubes 30 in order to increase the diameter of the passageways 18. This provides for very tight mechanical tolerances and an improved heat transfer between the laminated stack and the cooling tubes 30 when the diameters of the passageways 18 return to their initial size at ambient temperature. Each cooling tube 30 includes a first and a second end portion 30a, 30b which protrude respectively from a top side 15a and a bottom side 15b of the middle part 12a of the iron-core 12.

Referring to FIG. 10, the liquid-cooled core assembly 10 includes a cooling system having a liquid supply part 20 and a liquid collection part 40 mounted against respective top and bottom sides 15a, 15b of the middle part 12a of the iron-core 12. Both liquid supply and collection parts 20, 40 are manufactured as, for example, aluminum extruded parts, cut to the length of the motor.

Figure 6:
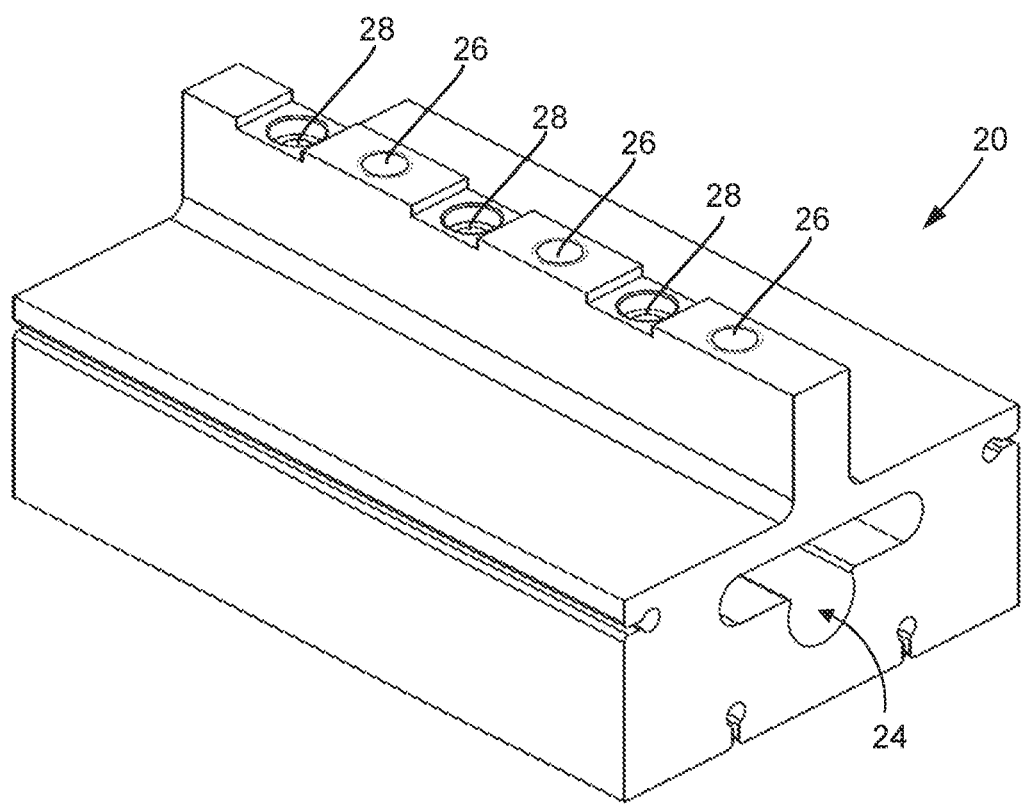
FIG. 6 is a bottom perspective view of the liquid supply part illustrated in FIG. 5.

Referring to FIGS. 5 to 7, each of the liquid supply and collection parts 20, 40 includes, respectively, a liquid supply duct 24 and a liquid collection duct 44 (see, e.g., FIGS. 7 and 11) extending through respective supply and collection parts 20, 40 along their entire length. The cross-section of the liquid supply and collection duct 24, 44 is, for example, constant along their entire length.

The liquid supply duct 24 includes, for example, a partial upper cylindrical portion 24a and a lower portion 24b extending across the width of the liquid supply part 40. The shape of the lower portion 24b may provide a cooling fluid reservoir that reduces as much as possible the pressure losses in the liquid supply duct 24 due to the fluid flow. The shape of the liquid collection duct 44 is, for example, identical to the shape of the liquid supply duct 24 in order to simplify the manufacturing operations of the liquid supply and collection parts 20, 40 by using the same extrusion die for both.

Each of the liquid supply and collection parts 20, 40 includes channels 26, 46 in fluid communication with respective liquid supply and collection duct 24, 44. As illustrated, for example, in FIG. 10, the end portion 27 of each channel 26 of the liquid supply part 20 is sealingly connected to the first end portion 30a of respective cooling tube 30, and the end portion 27 of each channel 46 of the liquid collection part 40 is sealingly connected to the second end portion 30b of respective cooling tube 30.

More particularly, referring, for example, to FIGS. 7 and 8, the end portion 27 of each channel 26 of the liquid supply part 20 includes a seal receiver portion 27a and a tube end receiving portion 27b. The seal receiver portion 27a may, for example, be cylindrical or a rectangular machined surface as illustrated in FIG. 6. Similarly, the end portion 47 of each channel 46 of the liquid collection part 20, as illustrated in FIG. 10, includes a seal receiver portion and a tube end receiving portion as illustrated in FIG. 9.

Figure 11:
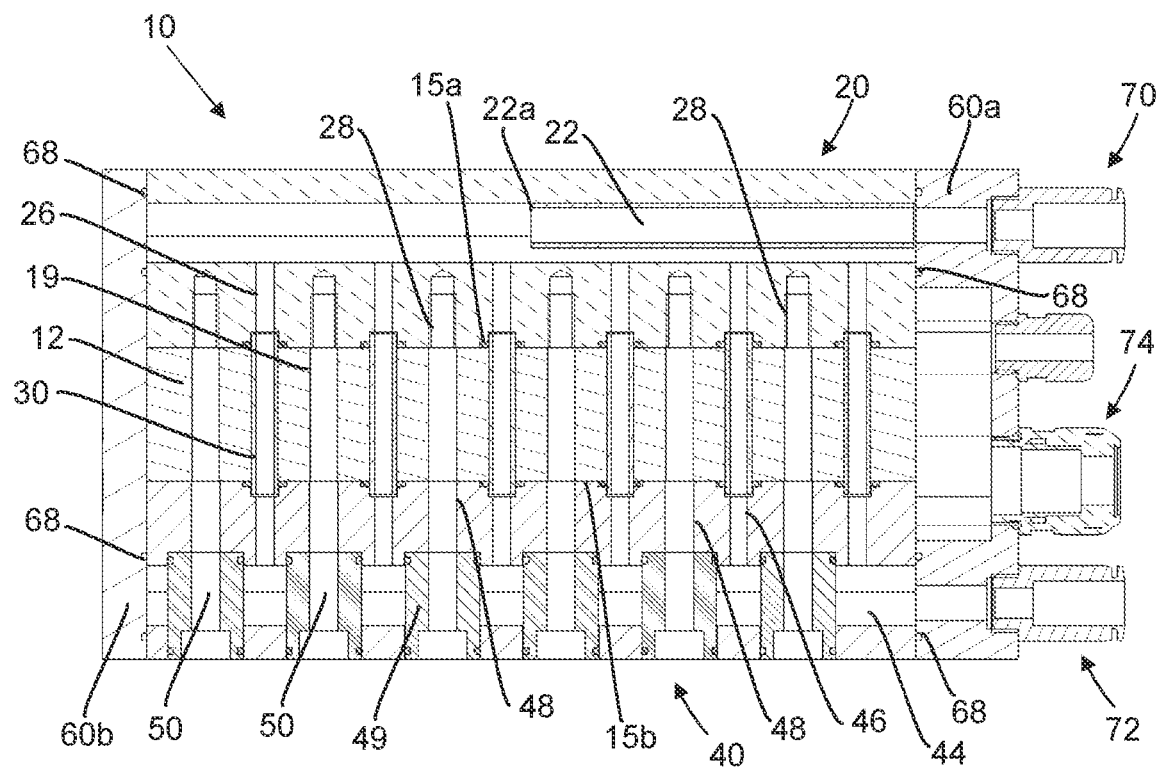
FIG. 11 is a cross-sectional view of the liquid-cooled core assembly.
Figure 12:
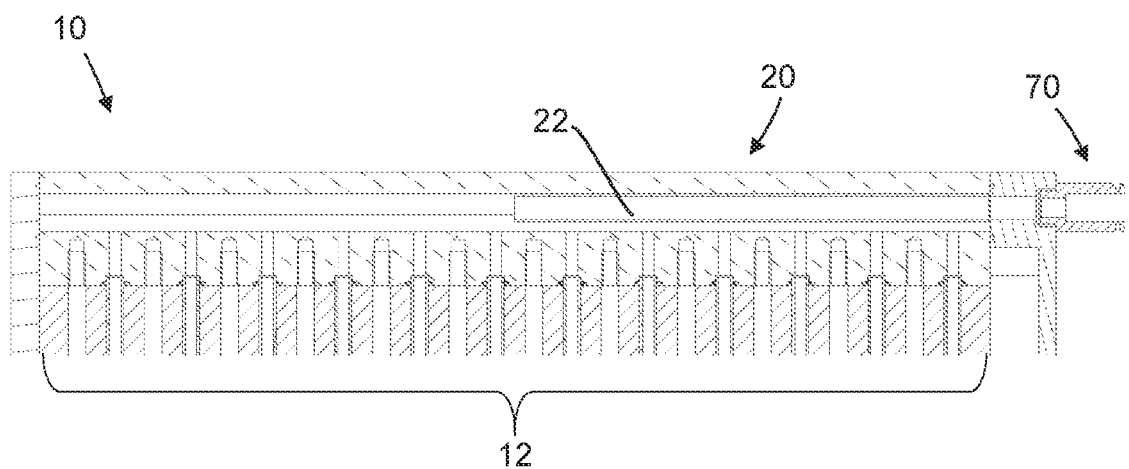
FIG. 12 is a partial cross-sectional view of a liquid-cooled core assembly according to an example embodiment of the present invention.

As illustrated, for example, in FIGS. 11 and 12, an inlet tube 22 is mounted inside the partial upper cylindrical portion 24a of the liquid supply duct 24. The inlet tube 22 is in fluid communication with an inlet connector 70 and extends along a portion of the liquid supply duct 24 such that an end portion 22a of the inlet tube 22 is located between a third and two thirds of the entire length of the supply duct 24. The end portion 22a of the inlet tube 22 is, for example, located around the middle of the entire length of the supply duct 24. The length of the inlet tube 22 is adapted to the size of the liquid-cooled core assembly 10 as illustrated in FIG. 12.

The inlet tube 22 provides that the cooling liquid flows into the lower portion 24b of the liquid supply duct 24 in the middle of the length thereof which extends in the longwise direction of the liquid-cooled core assembly 10 of the linear motor, thereby avoiding pressure and temperature gradients inside the core assembly.

Referring to FIG. 11, the liquid supply and collection part 20, 40 are assembled against respective top and bottom sides 15a, 15b of the iron-core 12 by screws 50. In that respect, the liquid supply part 20 includes threaded bores 28, and the liquid collection part 40 includes through-holes 48.

The screws 50 extend along respective through-holes 48 of the liquid collection part 40 and through-holes 19 of the iron-core 12, and the end portion of the screws 50 are screwed into the corresponding threaded bore 28 of the liquid supply part 20. Screw sleeves 49 are arranged around a section of the screws 50 that crosses the liquid collection duct 44 of the liquid collection part 40 in order to seal the screws 50 from the liquid collection part.

Each of the liquid supply and collection parts 20, 40 has a T-shaped cross-section to form a compartment with respective side of said two other opposite sides of the iron-core 12 for receiving the end turns of the coils.

Referring to FIG. 10, a first and a second mounting part 60a, 60b are assembled against respective first and second lateral sides of the iron-core 12 and of the liquid supply and collection part 20, 40. Each of the first and second mounting part 60a, 60b is connected to respective lateral sides of the liquid supply and collection part 20, 40 by self-tapping screws adjusted in the corresponding tubular portion of longitudinal slots 29 provided on the liquid supply and collection part 20, 40 as illustrated in FIGS. 5 to 7.

One mounting part 60a includes connector receiving cylindrical or threaded portions 62, 64 into which are mounted inlet and outlet connectors 70, 72 of the cooling system as illustrated in FIG. 11. The inlet connector 70 is located as close as possible to the customer interface 21 to provide that the interface remains at ambient temperature. Additional cylindrical or threaded portions 66 are provided on the mounting part 60a into which cable glands 74 are mounted for electrical connection of the coils wound around the teeth 16 of the iron-core 12.

As illustrated, for example, in FIG. 11, sealing grooves 68 are arranged on the first and second mounting parts 60a, 60b around both end portions of the liquid supply and collection ducts 24, 44 of respective supply and collection parts 20, 40 to avoid any leakage.

Figure 13A:
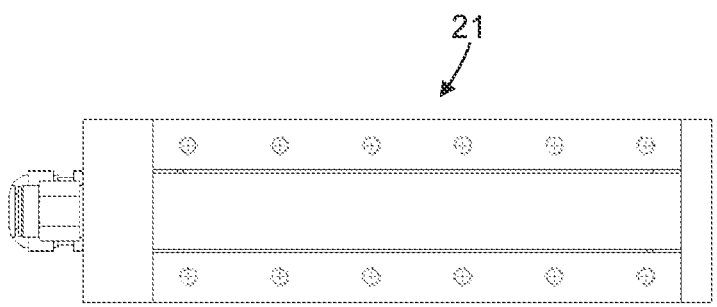
FIGS. 13a, 13b, and 13c are top views of the liquid-cooled core assembly with different configurations of the connecting part of the customer interface for connection to a permanent magnet assembly.
Figure 13B:
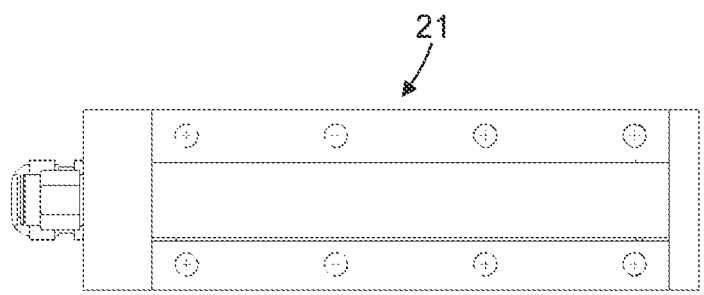
Figure 13C:
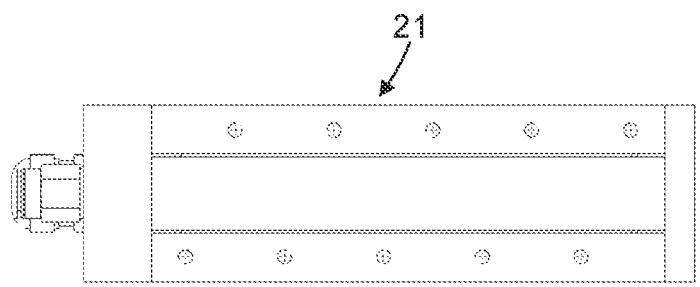

As illustrated, for example, in FIG. 5, the customer interface 21 includes threaded bores 21a for assembling the liquid-cooled core assembly 10 to a permanent magnet assembly of the linear motor. The customer interface may readily be adapted to comply with the configuration of the customer's permanent magnet assembly via minor modifications. For example, the pitch, the size, and/or the number of threaded bores 21a on the customer interface 21 may be changed as illustrated in FIGS. 13a, 13b, and 13c.

LIST OF REFERENCE NUMERALS

10 Liquid-cooled core assembly
12 Magnetic core
12a Middle part
13a, 13b Lateral sides
14a, 14b Longitudinal sides
15a, 15b Top and bottom sides
16 Teeth
17 Slots
18 Cooling-fluid passageways
19 Through-holes
20 Liquid supply part
21 Customer interface
21a Threaded bores
22 Inlet tube
22a End portion
24 Liquid supply duct
24a Partial cylindrical portion
24b Lower portion
26 Channels
27 End portion
27a Seal receiver portion
27b Tube end receiving portion
28 Threaded bores
29 Longitudinal slots
30 Cooling tubes
30a, 30b End portions
32 O-ring
40 Liquid collection part
44 Liquid collection duct
46 Channels
47 End portion
48 Through holes
49 Screw sleeves
50 Screws 50
60a, 60b First and second mounting parts
62, 64 Connector receiving portions
66 Cable glands receiving portions
68 Sealing rings 68
70 Inlet connector
72 Outlet connector
74 Cable glands

What is claimed is:

1. A liquid-cooled core assembly for a linear motor, comprising:
    an iron-core having a middle part, teeth extending from two opposite sides of the middle part and forming slots therebetween, coils wound around the teeth, axial cooling-fluid passageways extending through the middle part, and cooling conduits arranged inside the passageways;

a cooling system including a liquid supply part and a liquid collection part mounted against respective two other opposite sides of the iron-core, the liquid supply part and the liquid collection part being in fluid communication with the cooling conduits;

an inlet connector in fluid communication with the liquid supply part; and an outlet connector in fluid communication with the liquid collection part;

wherein the liquid supply part includes a liquid supply duct and channels in fluid communication with the liquid supply duct and sealingly connected to a first end portion of respective conduits, and wherein the liquid collection part includes a liquid collection duct and channels in fluid communication with the liquid collection duct and sealingly connected to a second end portion of the respective conduits;

wherein the iron-core includes axial through-holes extending across the middle part alternatingly with the cooling-fluid passageways;

wherein the liquid supply part and the liquid collection part are screw-connected against the iron-core; and wherein the liquid supply part includes threaded bores, the liquid collection part includes through-holes, and screws extend along respective through-holes of the liquid collection part and through-holes of the iron-core, an end portion of the screws being screwed into a corresponding threaded bore of the liquid supply part.

2. A liquid-cooled core assembly for a linear motor, comprising:

an iron-core having a middle part, teeth extending from two opposite sides of the middle part and forming slots therebetween, coils wound around the teeth, axial cooling-fluid passageways extending through the middle part, and cooling conduits arranged inside the passageways;

a cooling system including a liquid supply part and a liquid collection part mounted against respective two other opposite sides of the iron-core, the liquid supply part and the liquid collection part being in fluid communication with the cooling conduits;

an inlet connector in fluid communication with the liquid supply part; and an outlet connector in fluid communication with the liquid collection part;

wherein the liquid supply part includes a liquid supply duct and channels in fluid communication with the liquid supply duct and sealingly connected to a first end portion of respective conduits, and wherein the liquid collection part includes a liquid collection duct and channels in fluid communication with the liquid collection duct and sealingly connected to a second end portion of the respective conduits; and wherein an inlet tube is mounted inside the liquid supply duct, the inlet tube being in fluid communication with the inlet connector and extending along a portion of the liquid supply duct, an end portion of the inlet tube being located between one third and two thirds of a length of the supply duct.

3. The liquid-cooled core assembly according to claim 2, wherein the liquid supply part includes a liquid supply duct and channels in fluid communication with the liquid supply duct and sealingly connected to a first end portion of respective conduits, and wherein the liquid collection part includes a liquid collection duct and channels in fluid communication with the liquid collection duct and sealingly connected to a second end portion of the respective conduits.

4. The liquid-cooled core assembly according to claim 3, wherein the first and second end portions of each conduit protrude from respective two other opposite sides inside an end portion of a corresponding channel of respective liquid supply and collection parts.

5. The liquid-cooled core assembly according to claim 4, wherein the end portion of the channel includes a seal receiver portion inside which a seal and/or an O-ring is mounted around the first and second end portions of each conduit.

6. The liquid-cooled core assembly according to claim 3, wherein the iron-core includes axial through-holes extending across the middle part alternatingly with the cooling-fluid passageways.

7. The liquid-cooled core assembly according to claim 6, wherein a central axis of the passageways and the through-holes is aligned within a plane crossing the middle part of the iron-core and which is substantially equidistant between the two opposite sides of the middle part.

8. The liquid-cooled core assembly according to claim 6, wherein the passageways and the through-holes are aligned with two slots located the two opposite sides of the middle part.

9. The liquid-cooled core assembly according to claim 6, wherein the liquid supply part and the liquid collection part are screw-connected against the iron-core.

10. The liquid-cooled core assembly according to claim 9, wherein the liquid supply part includes threaded bores, the liquid collection part includes through-holes, and screws extend along respective through-holes of the liquid collection part and through-holes of the iron-core, an end portion of the screws being screwed into a corresponding threaded bore of the liquid supply part.

11. The liquid-cooled core assembly according to claim 10, wherein screw sleeves are arranged around sections of the screws that cross the liquid collection duct of the liquid collection part to seal the sections from the liquid collection duct.

12. The liquid-cooled core assembly according to claim 2, wherein the liquid supply part and the liquid collection parts have a T-shaped cross-section to form a compartment with a respective side of the two other opposite sides of the iron-core for receiving portions of the coils.

13. The liquid-cooled core assembly according to claim 2, wherein the end portion is located in a middle of the length of the supply duct.

14. The liquid-cooled core assembly according to claim 2, further comprising a first mounting part and a second mounting part assembled against respective first and second lateral sides of the iron-core and of the liquid supply part and the liquid collection part, wherein the inlet connector and the outlet connector are mounted into one of the first and second mounting parts.

15. The liquid-cooled core assembly according to claim 14, wherein cable glands, adapted for electrical connection of the coils, are mounted on the mounting part including the inlet and outlet connectors.

16. The liquid-cooled core assembly according to claim 2, wherein the liquid-cooled core assembly is adapted to be slidably mounted on a permanent magnet assembly of a linear motor.

17. The liquid-cooled core assembly according to claim 2, wherein the liquid-cooled core assembly is slidably mounted on a permanent magnet assembly of a linear motor.

18. A linear motor, comprising:
a permanent magnet; and
the liquid-cooled core assembly as recited in claim 2 slidably mounted on the permanent magnetic assembly.

* * * * *